(12) United States Patent
Parten et al.

(10) Patent No.: US 9,772,965 B2
(45) Date of Patent: Sep. 26, 2017

(54) MULTI-CHANNEL PERIPHERAL INTERCONNECT SUPPORTING SIMULTANEOUS VIDEO AND BUS PROTOCOLS

(71) Applicant: Texas Instruments Incorporated, Dallas, TX (US)

(72) Inventors: Brian Parten, Leander, TX (US); Yoon Lee, Allen, TX (US); Brian Quach, Richardson, TX (US); Lee Myers, Wylie, TX (US); Wesley Ray, Rockwall, TX (US); Win Maung, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 59 days.

(21) Appl. No.: 14/212,810

(22) Filed: Mar. 14, 2014

(65) Prior Publication Data
US 2014/0297898 A1      Oct. 2, 2014

Related U.S. Application Data

(60) Provisional application No. 61/784,339, filed on Mar. 14, 2013.

(51) Int. Cl.
| | | |
|---|---|---|
| G06F 13/38 | (2006.01) | |
| G06F 13/42 | (2006.01) | |
| G06F 1/16 | (2006.01) | |

(52) U.S. Cl.
CPC .......... *G06F 13/385* (2013.01); *G06F 1/1632* (2013.01); *G06F 13/4252* (2013.01); *Y02B 60/1228* (2013.01); *Y02B 60/1235* (2013.01)

(58) Field of Classification Search
CPC .. G06F 13/385; G06F 13/4252; G06F 1/1632; Y02B 60/1235; Y02B 60/1228
See application file for complete search history.

(56) References Cited

U.S. PATENT DOCUMENTS

| | | | |
|---|---|---|---|
| 6,738,852 B1 * | 5/2004 | Osborn ................ | G06F 1/1632 710/303 |
| 8,615,611 B2 | 12/2013 | Hall | |
| 8,799,537 B1 * | 8/2014 | Zhu ...................... | G06F 13/385 710/14 |
| 2002/0140675 A1 * | 10/2002 | Ali ....................... | A61B 5/0002 345/158 |
| 2013/0332642 A1 * | 12/2013 | Capezza ............. | G06F 13/4081 710/304 |

* cited by examiner

*Primary Examiner* — Idriss N Alrobaye
*Assistant Examiner* — Ronald Modo
(74) *Attorney, Agent, or Firm* — Gregory J. Albin; Charles A. Brill; Frank D. Cimino

(57) ABSTRACT

A method includes generating, by a control unit of a first device, a handshaking signal to be transmitted to a second device via a second channel. The method further includes based on the handshaking signal being acknowledged by the second device, configuring, by the control unit, the second channel to communicate non-display data and configuring a first channel connecting the first device to the second device to selectively communicate either display data or non-display data; and based on the handshaking signal being not acknowledged by the second device, configuring, by the control unit, the first channel to communicate display data.

13 Claims, 2 Drawing Sheets

MULTI-CHANNEL PERIPHERAL INTERCONNECT SUPPORTING SIMULTANEOUS VIDEO AND BUS PROTOCOLS

CROSS-REFERENCE TO RELATED APPLICATION

This application claims priority to U.S. Provisional Application 61/784,339 (TI-73593PS) filed Mar. 14, 2013, titled "Multi-Lane Peripheral Interconnect Supporting Simultaneous Video and Bus Protocols with Power Capability," and incorporated herein by reference.

BACKGROUND

DisplayPort is a digital interface developed by the Video Electronics Standards Association (VESA). Data transferred via DisplayPort includes information expressed in accordance with a DisplayPort standard. Generally, the data may include display data.

SUMMARY

Systems and methods to selectively transmit display data and/or non-display data by using a connecting device are disclosed herein. An apparatus may transmit display data only to a first type of dock device via the connecting device, or transmit display data and transmit non-display data to a second type of dock device via the same connecting device.

In an embodiment, an apparatus includes a display source unit, a bus host unit, a first switch, a second switch, and a control unit coupled to the first and second switches and to the display source unit. The first switch includes an input and an output, wherein the input of the first switch is coupled to the display source unit and to the bus host unit, and the output of the first switch is coupled to a first channel. The second switch includes an input and an output, wherein the input of the second switch is coupled to the bus host unit, and the output of the second switch is coupled to a second channel. The control unit is configured to use the second channel to assert a handshake signal to be transmitted to an external device. Based on a failure to receive an acknowledgment signal to the handshake signal via the second switch, the control unit is to configure the input of the first switch to receive display data from the display source unit. Further, based on an acknowledgment signal being received via the second switch, the control unit is to configure the input of the second switch to receive non-display data from the bus host unit and the input of the first switch to selectively receive either display data from the display source unit or non-display data from the bus host unit.

In another embodiment, a method to selectively determine a channel for non-display data or display data is disclosed herein. The method includes generating, by a control unit of a first device, a handshaking signal to be transmitted to a second device via a second channel. The method further includes based on the handshaking signal being acknowledged by the second device, configuring, by the control unit, the second channel to communicate non-display data and configuring a first channel connecting the first device to the second device to selectively communicate either display data or non-display data. The method still further includes based on the handshaking signal being not acknowledged by the second device, configuring, by the control unit, the first channel to communicate display data.

In accordance with a further embodiment, a system includes a first switch, a second switch, and a control unit coupled to the first switch and the second switch. The first switch, coupled to a first channel, is configured to receive video data from a source device or to receive non-video data from or to transmit non-video data to the source device. The second switch, coupled to a second channel, is configured to receive at least one of a configuration signal or to receive non-video data from the source device or to transmit non-video data to the source device. The control unit is configured to respond to a handshaking signal received by the second switch via the second channel, and based on receipt of the handshaking signal, configured to generate an acknowledgement signal to be sent to the source device and to cause the first switch to switch the first channel to either receive video data or receive or transmit non-video data, and to cause the second switch to switch the second channel to receive non-video data, a first configuration signal and a second configuration signal.

Still in accordance with a further embodiment, a computer includes an external connector, a control unit coupled to the external connector. The external connector is connectable via a DisplayPort cable to an external dock, wherein the external dock may be any of a plurality of types and each type with different capabilities. The external connector is configured to provide video data and universal serial bus (USB) data and to receive and transmit power. The control unit is configured to perform a configuration process via the external connector to determine the particular type of external dock connected to the external connector via the DisplayPort cable and to configure the computer based on the determined external dock type. More particularly, a first external dock type is capable only of receiving video data from the computer, and a second external dock type is capable of receiving video data from the computer as well as exchanging USB data. The configuration process also includes the control unit to determine whether the computer is to supply operating power to the external dock or whether the external dock is to supply operating power to the computer.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
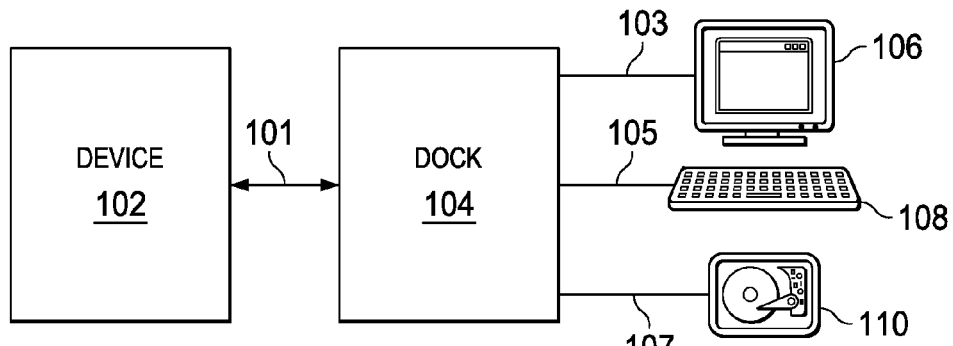
FIG. 1 shows a schematic diagram that illustrates combining display data and non-display data to be communicated over a connecting device in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

DisplayPort information includes any information transferred according to a DisplayPort communication standard. The DisplayPort communication standard is an interface and link protocol to communicate high definition display data across computer systems and electronic devices. Various versions (e.g., 1.1, 1.2 and 1.3) of the DisplayPort standard have been developed and defined by the Video Electronics Standards Association (VESA). The DisplayPort standard defines a multi-lane serial interface to connect a source device, such as a system that generates a media or multimedia signal, i.e., video and/or audio, with a sink device such as a display hardware that render an output signal in a visual manner.

Universal serial bus (USB) information includes any information transferred in accordance with a USB standard. The USB standard defines an interface (e.g., wired) and protocol to enable electronic devices to exchange data. Various standards associated with specific connectors have been developed to accommodate the standards. For example, USB 2.0, also referred to as high-speed USB, is defined to have a maximum bandwidth up to 480 Mbps, and USB 3.0, also referred to as super-speed USB, is configured to provide a signaling speed of 5 Gbps. Generally, the connector for the high-speed USB is colored in black and the connector for the super-speed USB is colored in blue in order to differentiate from the USB 2.0 connectors.

Commonly, a computing device such as a laptop computer requires multiple connectors and associated cables to communicate different types of data. For example, a DisplayPort connector and a DisplayPort cable are designated to transmit display data, and in addition to a USB 2.0 connector and a USB cable for transmitting non-display data (e.g., USB data), a USB 3.0 connector is also needed if a USB 3.0-compliant data transfer is requested. As such, a proliferation of connectors and cables may cause inconvenience to the user when connecting peripheral devices to a computing device.

Thus, it may be desirable to have a single cable capable of transmitting non-display data (e.g., USB data) and display data to peripheral devices connected to a computing device. Embodiments of the present invention provide an apparatus and a method for a computing device and a docking station wherein all display data and non-display data are communicated via a single cable connected between the computing device and the docking station.

FIG. 1 shows a schematic diagram illustrating an embodiment of a device 102 connected to a second device 104 via a connecting device 101 in accordance with various embodiments. As shown in FIG. 1, the second device 104 may be connected to a plurality of peripheral devices 106, 108 and 110. In some preferred embodiments, the device 102 may be a desktop computer or a laptop computer, generally referred to as a source device and the second device 104 may be a docking station or simply a dock (also referred to as a sink device). Second device 104 is referred to herein as a "dock." Further, the peripheral device 106 may be a display device (e.g., a monitor), the device 108 may be a keyboard in accordance with the USB 2.0 standard, and the device 110 may be a portable USB flash drive in accordance with the USB 3.0 standard.

In FIG. 1, connecting device 101 may be implemented as a cable which is used to connect the device 102 to dock 104. In general, the connecting device 101 may include any type of connection mechanism such as a cable or a direct connection without cable (e.g., a docking arrangement). More specifically, the device 102 may transmit display data and/or non-display data (e.g., USB data) to or receive non-display data from the dock 104 via the cable 101. In the example in which devices 106-110 include a monitor, a keyboard, and a flash drive, respectively, the dock 104 may transmit display data to the display device 106 via a cable 103, receive USB 2.0 data from the device 108 via a cable 105, and transmit USB 3.0 data to or receive USB 3.0 data from the device 110 via a cable 107. Although FIG. 1 shows the dock 104 distinct from the device 102, in some implementations, the dock 104 may be included as a part in the device 102 and cable 101 may be an internal cable. Additionally or alternatively, the plurality of peripheral devices 106, 108 and 110 may be coupled to the first device 102 without an intervening second device 104. As such, the first device 102 may include a capability to communicatively couple to the peripheral devices 106, 108 and 110 so as to transmit display data directly to the display device 106 via the cable 103, to receive USB 2.0 data from the device 108 via the cable 105, and to receive USB 3.0 data from the device 110 via the cable 107.

In addition to transmitting display data and non-display data via the cable 101, in accordance with a preferred embodiment, the connecting device 101 may be used to transmit power between devices 102 and 104. More specifically, the device 102 may source power to the dock 104 for operating dock 104 and peripheral devices 106-108, or the device 102 may be charged with power provided by the dock 104. Thus, power may flow either way through the connecting device 101 depending on the configuration of the system. For example, based on a type of the dock 104, the device 102 may source power to the dock 104, and vice versa. Details of whether the device 102 provides power to docket 104, or vice versa, will be described below.

Figure 2:
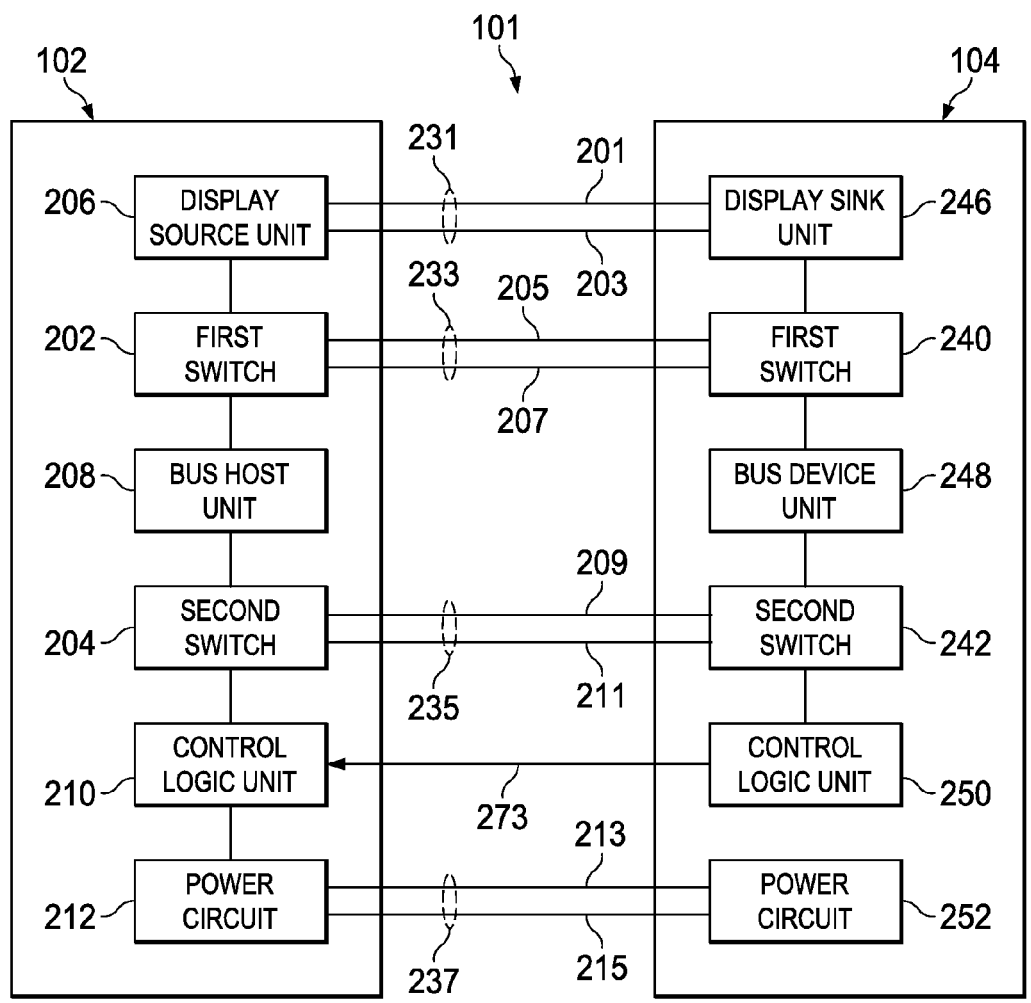
FIG. 2 shows block diagrams for a first device and a second device connected via a DisplayPort cable in accordance with various embodiments.

FIG. 2 shows an illustrative block diagram with additional detail of the device 102 and the dock 104 in accordance with various embodiments. The device 102 includes a first switch 202, a second switch 204, a display source unit 206, a bus host unit 208, a control logic unit 210, and a power circuit 212. Similarly to the device 102, the dock 104 has a first switch 240, a second switch 242, a display sink unit 246, a bus device unit 248, a control logic unit 250, and a power circuit 252. In some preferred embodiments, the control logic unit 210 may be a master control logic unit and the control logic unit 250 may be a slave control logic unit, or vice versa. Further, the switches 202, 204, 240 and 242 may be passive or active switches including multiplexers, de-multiplexers, duplexers, and the like.

Referring back to FIG. 1, the connecting device 101 is configured to connect the device 102 to the dock 104, and as shown in FIG. 2, the connecting device 101 may include channels 231, 233, 235 and 237. A "channel" is defined as a virtual conductor configured to communicatively couple data from a source device (e.g., the device 102) to a sink device (e.g., the dock 104). Each of the channels may include two or more lanes. A "lane" is a conductor or a pair of conductors included in the channel configured to transmit data. For example, as shown in FIG. 2, the channel 231 may include two lanes 201 and 203. The channel 233 may include two lanes 205 and 207. The channel 235 may include two lanes 209 and 211. The channel 237 may include two lanes 213 and 215.

In accordance with various embodiments, the device 102 may include an external connector connectable via the connecting device 101 (e.g., a DisplayPort cable) to the dock 104. The dock 104 may be varied in two types: a first type of the dock 104 is capable only of receiving display data from the device 102, and second type of the dock 104 is capable of receiving video data from the device 102 as well as exchanging USB data. Further, the control logic unit 210 coupled to the external connector is configured to perform a configuration process via the external connector in order to determine the particular type of the dock 104. Based on the configuration, the device 102's control logic unit 210 determines whether only display data will be transmitted via the cable 101 to the dock 104 or both of display data and USB data may be communicated between the device 102 and the dock 104. Still further, the configuration process also includes the control logic unit 210 to determine whether the device 102 is to supply operating power to the dock 104 or whether the dock 104 is to supply operating power to the device 102. Details will be described below.

Since the device 102 and the dock 104 have similar components (e.g., 202, 204, 206, 208, 210 and 212), a function of each component will be described with respect to the device 102. The first switch 202 includes an input and an output, wherein the first switch's input is coupled to the display source unit 206 and the bus host unit 208 and the first switch's output is coupled to the channel 233. The second switch 204, coupled to the control logic unit 210, includes an input and an output, wherein the second switch's input is coupled to the bus host unit 208 and the second switch's output is coupled to the channel 235.

The control unit 210, coupled to the first switch 202 and the second switch 204, is configured to use the channel 235 to assert a handshake signal to be transmitted to the dock 104. Details of corresponding operations of how the control logic unit 210 configures the first switch 202 and the second switch 204 after the handshake signal being asserted will be explained with respect to FIG. 3 and FIG. 4. Further, the control logic unit 210 is coupled to the power circuit 212. The power circuit 212 is configured to manage power control of the device 102 based on the control logic unit 210's commands. In some preferred embodiments, the commands may be associated with the asserted handshake signal. For example, the control logic unit 210 may configure the power circuit 212 to receive a predefined level of voltage via the channel 237 from the dock 104. Again, details of operations will be described with respect to FIG. 3 and FIG. 4.

Still referring to FIG. 2, the display source unit 206 may be configured to provide display data in one of at least three ways. First, the display source unit 206 may provide display data directly to the display sink unit 246 of the dock 104 via channel 231. Second, the display source unit 206, which is coupled to the input of the first switch 202, may provide display data through switches 202 and 240 and channel 233 to the display sink unit 246. Third, the display source unit 206 may provide display data through both channels 231 and 233 to the display sink unit 246 of dock 104.

The bus host unit 208 may be a part of a USB controller, a USB hub, and the like, and may be configured to couple the device 102 to another network or storage device. More specifically, the bus host unit 208 may be configured to communicatively transmit non-display data to the first switch 202 or receive non-display data from the first switch 202 and/or transmit non-display data to the second switch 204 or receive non-display data from the second switch 204. In some preferred embodiments, the non-display data being communicatively transferred between the bus host unit 208 and the first switch 202 may be, for example, USB 3.0 data or any other type of USB or other protocol data, and the non-display data being communicatively transferred between the bus host unit 208 and the second switch 204 may be USB 2.0 data.

As described above, the connecting device 101 includes multiple channels (e.g., 231, 233, 235, 237 and 273) to connect the device 102 and dock 104 as shown in FIG. 2. More particularly, the channel 231 is coupled the device 102's display unit 206 and the second device 104's display sink unit 246. In some preferred embodiments, the channel includes two lanes 201 and 203. In general, the lane 201 may be referred to as lane 0, and the lane 203 may be referred to as lane 1. Both of lane 0 and lane 1 are configured to transmit display data from the device 102 to dock 104 while bypassing the switches. The channel 233 couples the first switch 202 of the device 102 to the first switch 240 of dock 104. The channel 233 may include two lanes 205 and 207, which are generally referred to as lane 2 and lane 3 respectively. In a preferred embodiment, the lane 205 is configured to transmit display data or transmit non-display data (e.g., USB 3.0 data) from the device 102 to dock 104. The lane 207 is configured to transmit display data from the device 102 to the dock 104 or receive non-display data (e.g., USB 3.0 data) from the second device 104 to the device 102. The channel 235 may include two lanes 209 and 211. In a preferred embodiment, the lanes 209 and 211 may be inter-integrated circuit (I$^2$C) lanes. More specifically, the lane 209 is configured to function as a serial data (SDA) line and the lane 211 is configured to function as a serial clock (SCL) line. The channel 237 may include two lanes 213 and 215, which are used to transmit power either from the device 102 to the dock 104 or vice versa. Further, there may be a differential lane 273 coupled the device 102's control logic unit 210 to the dock 104's control logic unit 250.

In a preferred embodiment, a connection detection signal may be transmitted, via the lane 273, from the second device 104's control logic unit 250 to the device 102's control logic unit 210. For example, the connection detection signal may be a hot plug detect (HPD) signal. The connection detection signal may be configured to indicate that the dock 104 of some type has been plugged into the connector of the device 102. Once the connection detection signal is received by the device 102's control logic unit 210, the control logic unit 210 is configured to determine whether a configuration signal (e.g., a cable adapter detect signal) in the channel 209 is pulled high or in high state. If the configuration signal is in a high state, in some preferred embodiments, the device 102's control logic unit 210 may determine that the dock 104 plugged into the connector may be a device configured to receive display data only from the device 102. If the configuration signal is not in a high state, the control logic unit 210 will initiate the handshake signal via the I²C lanes (i.e., 209 and 211), as described below.

In various implementations, the handshake signal to be asserted by the control logic unit 210 of the device 102 is transmitted via the I²C lanes 209 (i.e., the SDA line) and 211 (i.e., the SCL line) from the device 102 to dock 104. The handshake signal may be included in data which is transmitted in, for example, a sequence of 8 bits. The bits are placed on the SDA line 209 starting with the most significant bit. The SCL line 211 is then pulsed high, then low. For every 8 bits transmitted from the device 102, the dock 104 sends back an acknowledge bit. As such, there may be 9 SCL clock pulses to transmit each 8 bit byte of data. If the dock 104 sends back a low acknowledgment bit, then it means that the dock 104 has received the data and is ready to accept another byte of data from the device 102. However, if the dock 104 sends back a high acknowledgement bit, it indicates that the dock cannot accept any further data and the device 102 will terminate sending data to the dock 104. In some preferred embodiments, the dock 104 may pull the clock pulse to remain in a low state so as to stretch a time for the device 102 to receive the acknowledge bit. As such, the dock 104 may stretch the time for the device 102 to send the next byte of data.

Additionally, in a preferred embodiment, after the device 102 receives the acknowledgement of the handshake signal from the dock 104, a connection detection heartbeat signal may be generated by the dock 104's control logic unit 250, and transmitted from the control logic unit 250, via the channel 273, to the device 102's control logic unit 210. The connection detection heartbeat signal may be a series of pulses over a time domain. The connection detection heartbeat signal may be configured to at least one of: (a) prevent the connection detection signal being asserted to the display source unit 206, (b) gain margin time to allow the peripheral display device (e.g., 106) to be ready, (c) keep the channels 233 and/or 235 to be alive (i.e., still able to transmit non-display data), or (d) keep power delivery enabled on channel 237.

Figure 3:
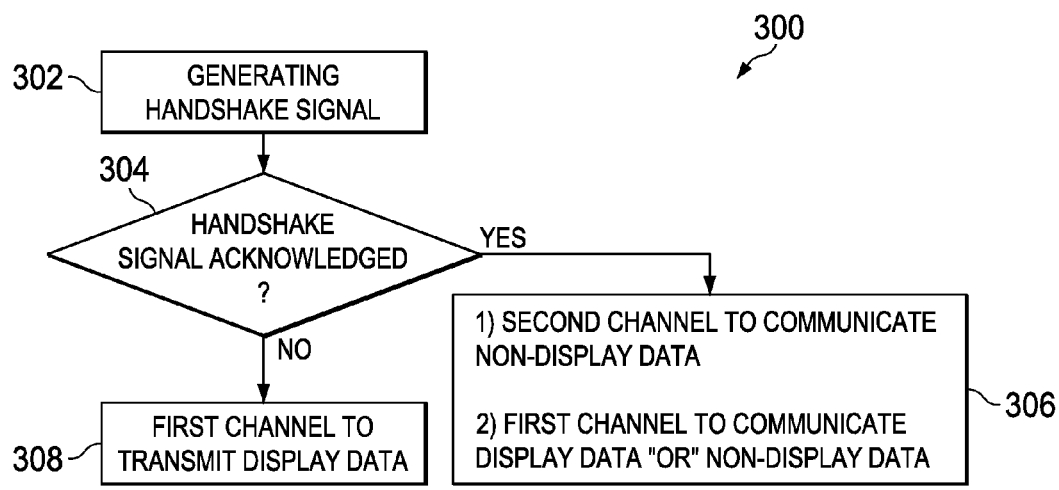
FIG. 3 shows a method to selectively transmit display data or non-display data via a cable in accordance with various embodiments.

FIG. 3 shows a method 300 illustrating how the device 102 configures a channel to communicatively couple non-display and/or display data to dock 104 in accordance with various embodiments. The method 300 starts with block 302 generating a handshake signal by the device 102's control logic unit 210. Then the control logic unit 210 configures the second switch 204 to transmit the handshake signal via the channel 235 to the dock 104. The handshake signal includes information questioning dock 104's control logic unit 250 whether the second switch 242 has an ability to transmit or receive non-display data (e.g., USB 2.0 data). In some preferred embodiments, the information may be formatted as data to be transmitted via the SDA line 209.

In FIG. 3, the method 300 continues with block 304 determining, by the control logic unit 210, whether the handshake signal is acknowledged by the dock 104. More specifically, if the dock 104's control logic unit 250 determines that the second switch 242 of dock 104 is unable to transmit or receive non-display data (e.g., USB 2.0 data), an acknowledgment signal will not be sent from the second device 104, which routes the method 300 to block 308. More particularly, in a preferred implementation, if the device 102 does not receive the acknowledgment signal within a predetermined period of time, the control logic unit 210 may determine that the dock 104 does not have the capability to transmit non-display data through the channel 235. In accordance with FIG. 3, the channel 233 is referred to as a first channel and the channel 235 is referred to as a second channel.

Still referring to block 304, if the dock 104's control logic unit 250 determines that the second switch 242 is able to transmit or receive non-display data (e.g., USB 2.0 data) through the channel 235, the acknowledgment signal will be sent from the dock 104 to the device 102 through the channel 235, which causes control to flow to block 306 in FIG. 3.

In block 308, in response to a failure of the acknowledgement signal being received by the device 102, the control logic unit 210 configures the first switch 202 to transmit display data via the channel 233 to the dock 104. Further, since the dock 104's second switch 242 is unable to receive non-display data from the device 102, the control logic unit 210 may configure the device 102's second switch to use the channel 235 to transmit further configuration signal or to function as a spare channel to transmit display data.

In block 306, in response to receiving the acknowledgement signal from the dock 104, the control logic unit 210 configures the second switch 204 to transmit non-display data (e.g., USB 2.0 data) to the dock 104 or receive non-display data (e.g., USB 2.0 data) from the dock 104. Further, the control logic unit 210 is configured to selectively determine if the first switch 202 is configured to transmit display data or non-display data based on a response to a further configuration signal, and to determine whether the power circuit 212 is configured to source power to or receive power from the dock 104 based on a response to a further configuration signal. Details of the determining in block 306 will be described in accordance with FIG. 4.

Figure 4:
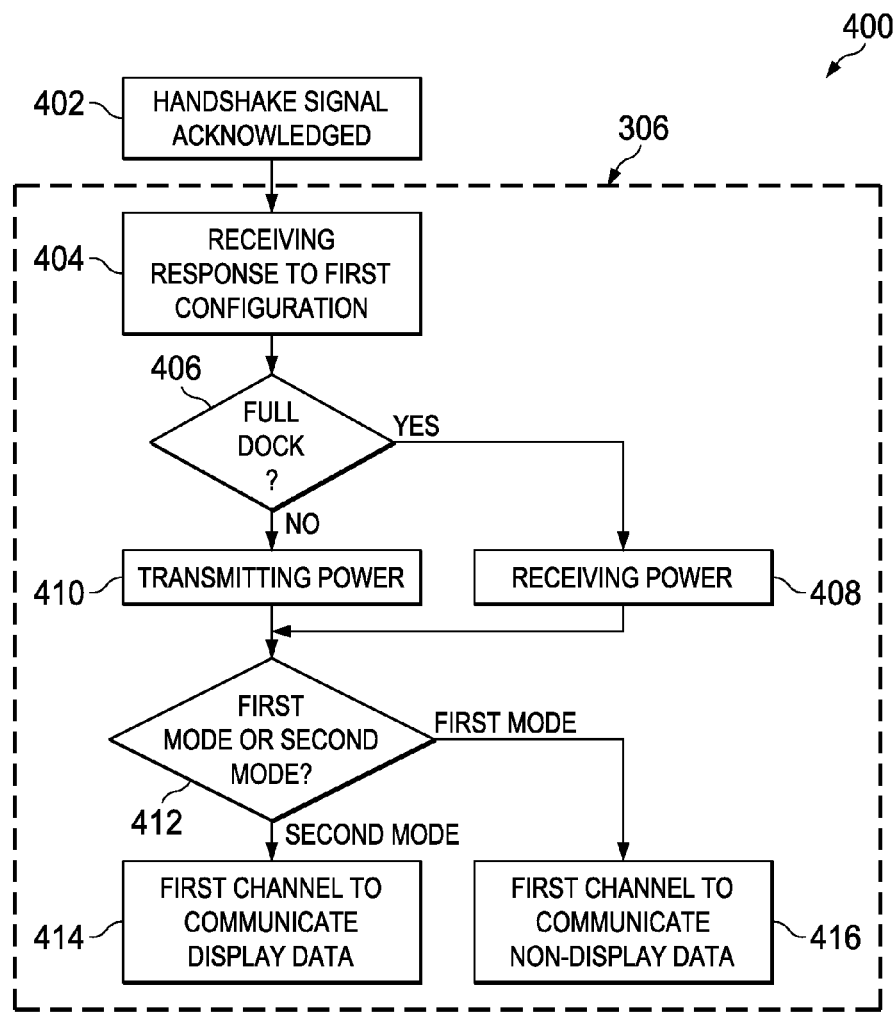
FIG. 4 shows a method that illustrates further details to selectively transmit display data or non-display data via a cable in accordance with various embodiments.

FIG. 4 shows a method 400 to further illustrate details of block 306 in method 300. The method 400 starts with block 402 showing that the handshake signal has been acknowledged by the dock 104's control logic unit 250 and the device 102's control logic unit 210 has received the acknowledgment signal. Part of the method 400 continues as block 306, which is shown as dotted outline in FIG. 4. After the control logic unit 210 of the device 102 receives the acknowledgment, the method 400 continues with block 404 in which the device 102 receives a response to a first configuration signal transmitted by the switch 204 to the dock 104 via the channel 235. The first configuration signal includes information questioning whether the dock 104 has a full docking functionality. A device having "full docking functionality" sources its own power (i.e., does not need power from device 102) and may or may not provide power to the device 102. A device that does not have fully docking functionality does not have a self-supporting power source. Generally, this latter type of device is referred to as a "dongle" dock, and the dongle dock may or may not receive power from the device 102. After the first configuration signal is received by the dock 104's second switch 242, the control logic unit 250, based on a self-configuration to verify whether the dock 104 has the full docking functionality, generates the response and causes the second switch 242 to transmit the response to the first device via the channel 235.

In block 406, after the first device receives the response to the first configuration signal, the control logic unit 210 determines, based on the received response whether the dock 104 has the full docking functionality. If the dock 104 has the full docking functionality, the method 400 routes to block 408 in which the control logic unit 212 configures the power circuit 212 in the device 102 to receive power from the power circuit 252 of the dock 104. More particularly, the block 408 may include several steps. For example, first, the control logic unit 212 may send a power delivery command to the power circuit 212. Second, the control logic unit 210 may further receive a signal comprising a selection of a level of voltage to be charged from the dock 104. In various embodiments, the signal may be generated by the dock 104's control logic unit 250, and may be transmitted via the channel 235. Further, in accordance with various embodiments, the levels of voltages may include 0V, 5V, 12V and 19V (or other suitable voltage). After the control logic unit 210 selects a desired level of voltage, for example 5V, the control logic unit 210 sends an "ON" command to the second device 104 via the channel 235. The "ON" command may enable the control logic unit 250 to cause the power circuit 252 to start sourcing power, via the channel 237, to the power circuit 212 in the device 102 at the level of voltage selected by the control logic unit 210 in the device 102.

If the dock 104 does not have the full docking functionality, the method 400 routes to block 410. In the block 410, the control logic unit 210 causes the power circuit 212 to source power to the dock 104's power circuit 252. In a preferred embodiment, the power may be transmitted via the channel 237 and the lane 213 of the channel 237 may be configured to transmit power in a level of 3V, and the lane 215 of the channel 237 may be configured to transmit power in a level of 5V.

Still referring to FIG. 4, the method 400 continues at block 412 which determines whether a first mode or a second mode is implemented by the dock 104. In the block 412, the control logic unit 210 first causes the second switch 204 to transmit a second configuration signal via the channel 235 to the dock 104. The second configuration signal includes information questioning either the first mode or the second mode that the dock 104 chooses to implement.

The first mode is configured to use the channel 233 to transmit non-display data (e.g., USB 3.0 data) to the dock 104 or receive non-display data (e.g., USB 3.0 data) from the dock 104. The second mode is configured to use the channel 233 to transmit display data to the dock 104. Generally, the first mode is referred to as 2-lane mode since only two lanes 201 and 203 in the channel 231 are used to transmit display data. The second mode is referred to as 4-lane mode since there are four lanes 201, 203, 205 and 207 being implemented to transmit display data.

Still referring to the block 412, if the second device 104's control logic unit 250 chooses the first mode to communicate with the device 102, the method 400 routes to block 416. If the dock 104's control logic unit 250 chooses the second mode to communicate with the device 102, the method 400 routes to block 414.

In the block 416, once the device 102's control logic unit 210 receives the response to the second configuration signal indicating that the first mode has been chosen by the dock 104, the control logic unit 210 configures the bus host unit 208 to provide non-display data (e.g., USB 3.0 data) to the input of the first switch 202 and causes the first switch 202 to transmit non-display data (e.g., USB 3.0 data) to the dock 104 via the channel 233 (i.e., the first channel). Further, the control logic unit 210 may also configure the first switch 202 to receive non-display data (e.g., USB 3.0 data) from the dock 104 via the channel 233.

Similarly, in the block 414, once the device 102's control logic unit 210 receives the response to the second configuration signal indicating that the second mode has been chosen by the dock 104, the control logic unit 210 configures the input of the first switch 202 to receive display data from the display source unit 206 and causes the first switch 202 to transmit display data to the second device 104 via the channel 233.

Alternatively, rather than the control logic unit 210 initiating the second configuration by transmitting the second configuration signal from the device 102 to the dock 104 as described in the block 412, the dock 104 may initiate the second configuration to switch between the first mode (i.e., 2-lane) and the second mode (i.e., 4-lane) by receiving a lane configuration signal. The lane configuration signal may be provided by a user. More particularly, once the dock 104's control logic unit 250 detects the lane configuration signal, the control logic unit 250 configures the first switch 240 to switch between the second mode to receive display data and the first mode to receive non-display data. For example, the device 102 and the dock 104 may originally operate in the second mode, which means the channels 231 and 233 are used to transmit display data. In response to the lane configuration signal being detected by the control logic unit 104, the control logic unit 104 may start to configure the first switch 240 to a stand-by mode so that the first switch 240 is ready to receive non-display data. Then, the control logic unit 250 transmits a signal, via the channel 273, to the device 102's control logic unit 210 to cause the control logic unit 210 to send a handshake signal to determine whether the dock 104's first switch 240 has a capability to receive non-display data from the device 102. If the handshake signal is acknowledged by the dock 104, non-display data will be communicated via the channel 233 between the device 102 and the dock 104.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a display source unit;
   a bus host unit;
   a first switch including an input and an output, the first switch's input coupled to the display source unit and to the bus host unit, and the first switch's output coupled to a first channel;
   a second switch including an input and an output, the second switch's input coupled to the bus host unit and the second switch's output coupled to a second channel;
   a control unit coupled to the first and second switches and to the display source unit, and wherein the control unit is configured to use the second channel to assert a handshake signal to be transmitted to an external device; and
   a power circuit coupled to the control unit;
   wherein, based on a failure to receive an acknowledgment signal to the handshake signal via the second switch, the control unit configures the input of the first switch to receive display data from the display source unit, and configures the power circuit to transmit power to the external device via a power pin held at a constant voltage and a return pin held at ground;
   wherein, based on an acknowledgment signal being received via the second switch, the control unit configures the input of the second switch to receive non-display data from the bus host unit, configures the input of the first switch to selectively receive either display data from the display source unit or non-display data from the bus host unit, and receives information that indicates whether the external device has full docking functionality;

wherein, in response to the external device not having the full docking functionality, the control unit configures the power circuit to source power to, if connected, the external device via the return pin; and wherein, in response to the external device having the full docking functionality, the control unit configures the power circuit to receive power from, if connected, the external device via the return pin.

2. The apparatus of claim 1 wherein based on receipt of the acknowledgment signal via the second switch, the control unit is configured to generate and provide a first configuration signal and a second configuration signal to the input of the second switch so as to cause the control unit to receive a first response signal to the first configuration signal and a second response signal to the second signal from the external device via the second channel.

3. The apparatus of claim 2 wherein the first response signal comprises the information that indicates whether the external device has the full docking functionality, and the second response signal comprises information that indicates whether a first mode or a second mode is implemented by the external device.

4. The apparatus of claim 3 wherein, in response to the second response signal indicating that the first mode is implemented by the external device, the control unit is to configure the input of the first switch to receive non-display data from the bus host.

5. The apparatus of claim 3 wherein, in response to the second response signal indicating that the second mode is implemented, the control unit is to configure the input of the first switch to receive display data from the display source unit.

6. A method, comprising:
generating, by a control unit of a first device, a handshaking signal to be transmitted to a second device via a second channel;
based on the handshaking signal being not acknowledged by the second device, configuring, by the control unit, a first channel to communicate display data and configuring a power circuit to transmit power to the second device via a power pin held at a constant voltage and a return pin held at ground;
based on the handshaking signal being acknowledged by the second device, configuring, by the control unit, the second channel to communicate non-display data, configuring the first channel connecting the first device to the second device to selectively communicate either display data or non-display data, and receiving a signal indicating whether the second device has full docking functionality;
in response to the signal indicating that the second device has the full docking functionality, receiving power from the second device via the return pin; and
in response to the signal indicating that the second device does not have the full docking functionality, sourcing power to the second device via the return pin.

7. The method of claim 6 wherein the non-display data comprises: universal serial bus (USB) data, a first configuration signal and a second configuration signal.

8. The method of claim 7, wherein the signal indicating whether the second device has the full docking functionality is a first response signal to the first configuration signal, the method further comprising receiving a second response signal to the second configuration signal, wherein the second response signal indicates whether a first mode or a second mode is implemented by the second device to operate the first device.

9. The method of claim 8 further comprising: in response to the first response signal indicating that the second device does not have the full docking functionality, configuring both the first and second channels to communicate non-display data, or the first channel to communicate display data and the second channel to communicate non-display data.

10. The method of claim 8 further comprising, in response to the first response indicating that the second device has the full docking functionality:
configuring the second channel to communicate non-display data; and
based on the second response signal, configuring the first channel to selectively communicate either non-display data or display data.

11. The method of claim 10 further comprising, in response to the second response signal indicating that the second device is to operate in the first mode, configuring the first channel to communicate non-display data.

12. The method of claim 10 further comprising, in response to the second response signal indicating that the second device is to operate in the second mode, configuring the first channel to communicate display data.

13. A computer, comprising:
an external connector connectable via a DisplayPort cable to an external dock, said external dock being any of a plurality of types, each type with different capabilities,
wherein the external connector is to provide video data and universal serial bus (USB) data and to receive or transmit power; and
a control unit coupled to the external connector and configured to perform a configuration process via the external connector to determine the particular type of external dock connected to the external connector via the DisplayPort cable and to configure the computer based on the determined external dock type;
wherein a first external dock type is capable only of receiving video data from the computer;
wherein a second external dock type is capable of receiving video data from the computer as well as exchanging USB data; and
wherein the configuration process also includes the control unit to receive a signal indicating the particular type of the external dock based on a handshaking signal being acknowledged by the external dock, and determine, based on the signal indicating the particular type of the external dock, whether the computer is to supply operating power to the external dock via a power pin and a return pin or whether the external dock is to supply operating power to the computer via the power pin and the return pin.

* * * * *